Figure 1:
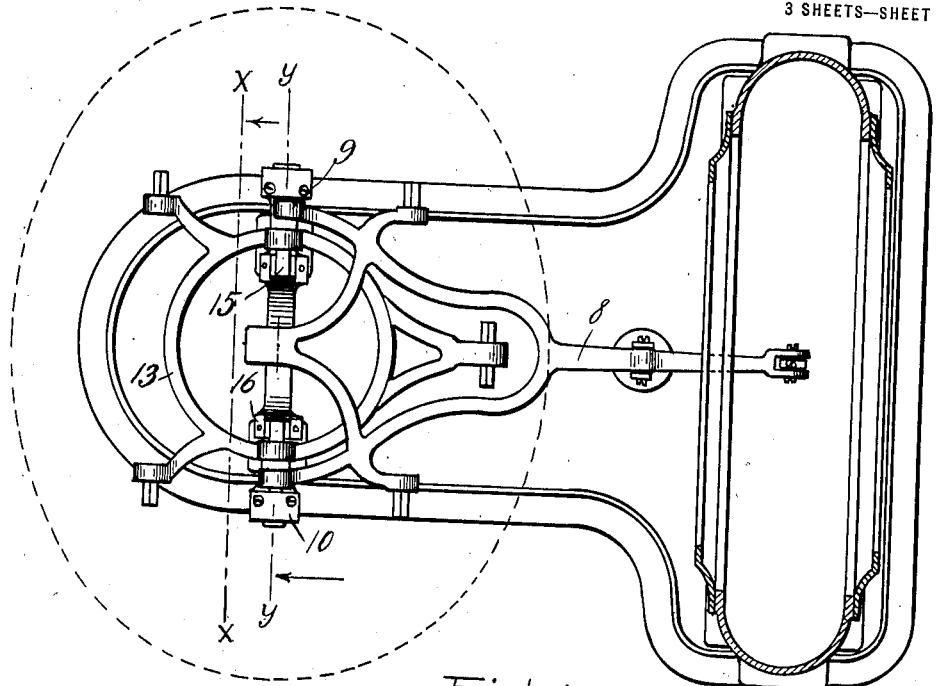

H. O. HEM.
WEIGHING SCALE.
APPLICATION FILED OCT. 23, 1916.

1,366,881.

Patented Jan. 25, 1921.
3 SHEETS—SHEET 1.

Witnesses.

INVENTOR.
Halvor O. Hem
by George R. Frye.
Atty

H. O. HEM.
WEIGHING SCALE.
APPLICATION FILED OCT. 23, 1916.
1,366,881.
Patented Jan. 25, 1921.
3 SHEETS—SHEET 2.
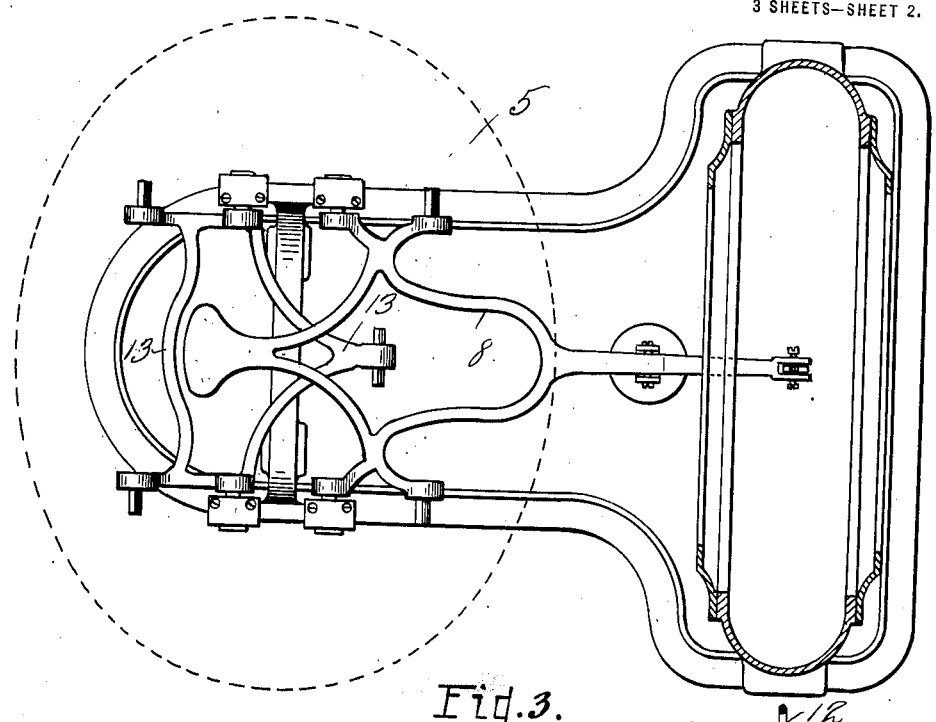
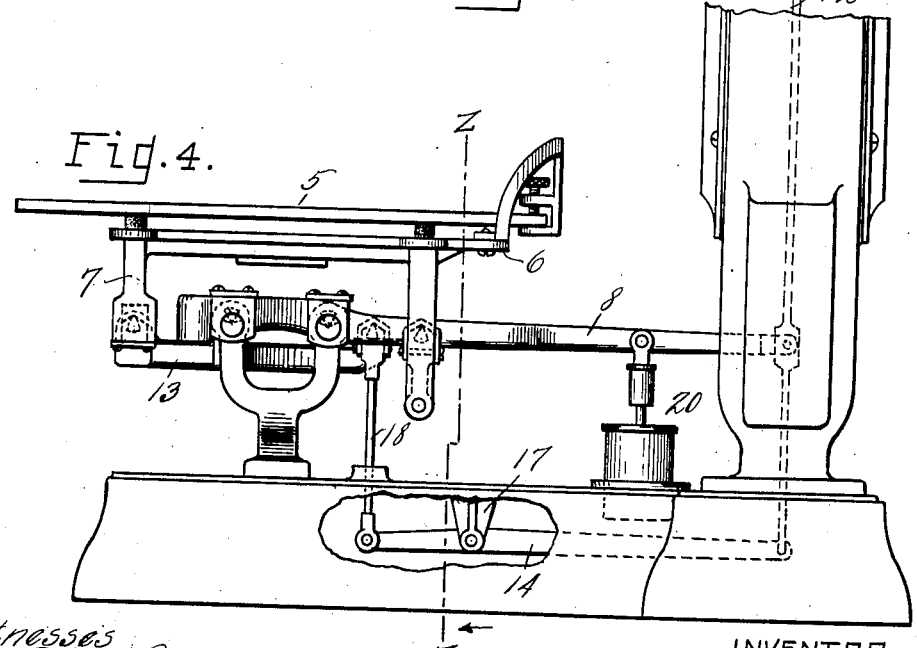
INVENTOR.
Halvor O. Hem
by George R. Frye.
Atty.

H. O. HEM.
WEIGHING SCALE.
APPLICATION FILED OCT. 23, 1916.
1,366,881.
Patented Jan. 25, 1921.
3 SHEETS—SHEET 3.
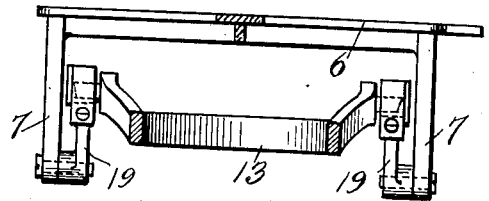
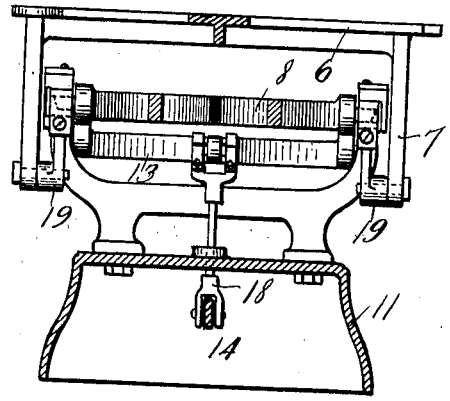
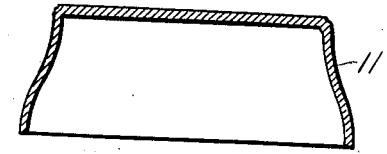
Fig. 5.
Fig. 7.
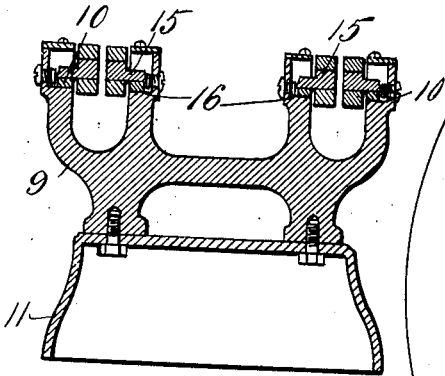
Fig. 6.
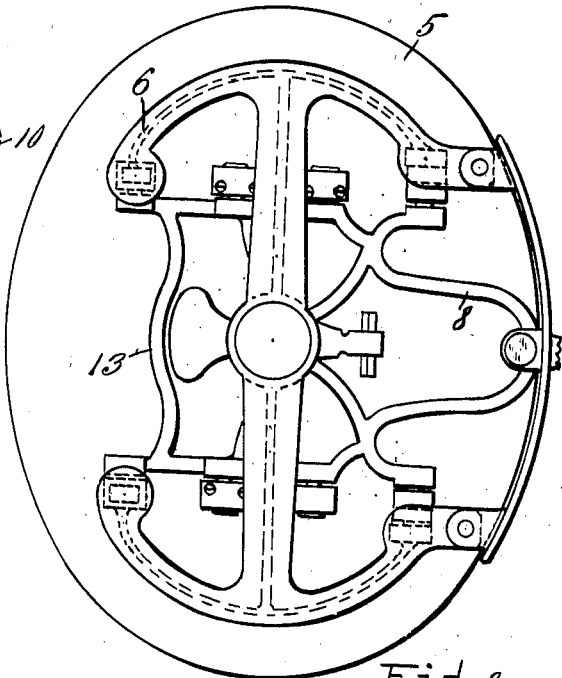
Fig. 8.
Witnesses.
INVENTOR.
Halvor O. Hem
by George R. Frye.
Atty.

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING-SCALE.

1,366,881.  Specification of Letters Patent.  Patented Jan. 25, 1921.

Application filed October 23, 1916. Serial No. 127,256.

*To all whom it may concern:*

Be it known that I, HALVOR O. HEM, a citizen of the United States, residing at Toledo, in the county of Lucas and State of Ohio, have invented certain new and useful Improvements in Weighing-Scales, of which the following is a specification.

This invention relates to weighing scales, and more particularly to that type of weighing scales known as counter scales and adapted to rest upon the counters of stores, shops and factories.

In the majority of counter scales now on the market it is necessary to employ a check rod or link in connection with the scale beam to cause the platform to descend in a vertical direction and at the same time remain in a true horizontal position, and also to prevent tipping of the platform when the load to be weighed is placed near the edge thereof. Such check link mechanism needs to be most accurately constructed and adjusted to maintain accuracy in weighing, and rough handling, long continued usage of the scale in the same manner, and other causes commonly met with in every-day weighing in stores and factories serve to dull the edges of the pivots and destroy the parallelogram relation of the check rod and scale beam. The primary object of the present invention is to obviate the objections to the usual check link mechanism by eliminating the necessity of using a check link, and further to so support the scale platform that an equable distribution of weight of the article being weighed is apportioned over a plurality of supporting pivots carried by the lever mechanism connecting the platform with the load-offsetting mechanism.

Other objects and advantages will readily appear from the following description, in which reference is had to the accompanying drawings illustrating preferred embodiments of the invention and wherein similar reference numerals designate similar parts throughout the several views.

In the drawings:—

Figure 2:
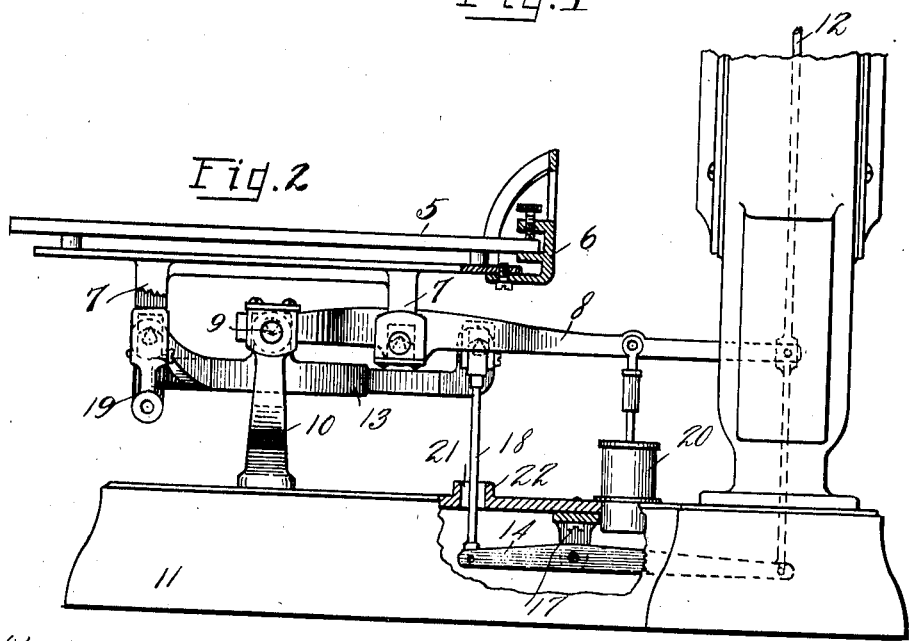

Figure 1 is a plan view of the platform-supporting lever mechanism in position upon the scale base, a portion of the scale casing being shown shown in section; Fig. 2 is a side view thereof; Fig. 3 is a plan view similar to Fig. 1 of another form of the platform-supporting mechanism; Fig. 4 is a side view of the embodiment shown in Fig. 3; Figs. 5 and 6 are sections taken substantially on the lines x—x and y—y of Fig. 1 looking in the direction of the arrows; Fig. 7 is a vertical section taken substantially on the line z—z of Fig. 4; and Fig. 8 is a plan view of the lever mechanism shown in Fig. 3 with the platform and platform spider in position thereon.

In the drawings I have shown two forms of platform-supporting lever mechanisms by way of example, and it is to be understood that the lever mechanisms may be suitably connected with load-offsetting or weighing mechanisms of various types, there being several forms of weighing mechanisms now on the market well adapted to be utilized in connection with the lever mechanisms I have herein shown, these weighing mechanisms including pendulum, spring and beam scale types.

The scale platforms 5 are supported upon platform spiders 6 which in turn are provided with depending legs 7 carrying bearings adapted to rest upon knife-edge pivots upon the lever mechanism. Referring to the construction illustrated in Figs. 1 and 2, a main lever 8 is supported adjacent its forward extremity upon fulcrum bearings 9 carried in the bracket 10 mounted upon the base 11 of the scale, the rear extremity of this lever being pivotally connected with the steelyard or draw-rod 12 adapted to establish the connection with the load-offsetting mechanism of the scale. Upper and lower auxiliary levers 13 and 14 respectively coöperate with the main lever 8 in supporting the platform 5 and transmitting the movement thereof to the steelyard rod 12, the upper auxiliary lever 13 being preferably formed as a lever of the first order having its fulcrum pivots 15 resting upon inner bearings 16 carried by the same bracket 10 and in line with the fulcrum bearings 9 of the main lever. (See Fig. 1.)

At its opposite ends the auxiliary lever 13 is provided with upwardly-pointed knife-edge pivots through which connection is made with the forward legs 7 of the platform and the forward extremity of the lower auxiliary lever 14, whereby the movement of the platform 5 will be transmitted through the upper auxiliary lever 13 to the lower auxiliary lever 14. The lower auxiliary lever 14 is herein shown as formed as a lever of the first order, being pivoted intermediate its ends upon brackets 17 carried by the scale base, and pivotally connected adjacent its opposite extremities with the steelyard rod 12 and a connecting loop 18, the upper extremity of which coöperates with the upper auxiliary lever 13. The legs 7 of the platform spider may carry agate or like bearings to directly rest upon the upturned knife edges of the main and auxiliary levers 8 and 13, but in that case the knife edges would not remain seated in the agate bearings during the full rocking movement of the levers, and to overcome this difficulty and permit the knife edges to remain positively seated during the full lever movement, I interpose means, such as the links 19, between one pair of legs 7 and the adjacent knife edges whereby the links will take up the lateral movement due to the curve of the travel of the knife edge during the rocking of the levers, the links merely pivoting upon the knife edges and the pins connecting them with the legs 7. In the embodiment shown in Figs. 1 and 2 I have illustrated the links 19 as connected at their lower extremities with the forward legs 7 and at their upper extremities provided with agate bearings resting upon the knife edges at the forward extremity of the auxiliary lever 13, the rear legs 7 carrying agate bearings directly resting upon the knife edges of the main lever 8. However, this construction could readily be reversed and the links 19 interposed between the rear legs 7 and the knife edges of the main lever, a construction of this type being illustrated in the modification shown in Figs. 3 and 4.

The modification illustrated in Fig. 4 further differs from that shown in Figs. 1 and 2 in that the knife edges supporting the platform 5 are farther apart and the fulcrum pivots of the main and upper auxiliary levers are not arranged in the same plane, thus rendering the construction somewhat more stable and adaptable for weighing loads of relatively greater capacity.

In operation, the platform 5 is moved downwardly by the imposition of a load to be weighed, and this movement is directly transmitted through the legs 7 to the main lever 8 and the upper auxiliary lever 13, the arrangement being such that the main lever 8 will be swung downwardly through an arc with its fulcrum pivots as a center while the upper auxiliary lever 13, being a lever of the first order, will be rocked on its fulcrum so that the rear arm thereof will be swung upwardly, thereby exerting a pull upon the connecting rod 18 to rock the forward arm of the lower auxiliary lever 14 upwardly and the rear arm thereof downwardly. The rear extremities of the main lever 8 and lower auxiliary lever 14 being secured to the steelyard rod 12, the rocking movements of said levers will be directly transmitted to said rod and simultaneously exert a pull upon the load-offsetting mechanism of the scale, with which the upper end of the steelyard rod is to be connected. To damp the movement of the lever mechanism suitable means may be provided, as, for example, the dash pot 20 supported in the base 11 of the scale and connected with one of the levers.

In constructing a scale of this type an opening 21 must be left in the top of the scale base for the passage of the connecting rod 18. An opening in this location would ordinarily allow the admission of liquids, etc., that had fallen from the platform of the scale during the weighing operations, such liquid falling upon or adjacent to the lower auxiliary lever 14. To obviate this objectionable feature I have provided an upwardly-extending bead 22 around the opening 21 to prevent the entrance of the liquid into said opening unless the collection of liquid should become very great, and before such an amount of liquid could gather as to fall into the opening, the attention of the grocer or other scale operator would be called thereto.

While it will be apparent that the illustrated embodiments of my invention herein disclosed are well calculated to adequately fulfil the objects and advantages primarily stated, it is to be understood that the invention is susceptible to modification, variation and change without departing from the spirit and scope of the invention as set forth in the subjoined claims.

Having described my invention, I claim:

1. In a weighing scale, platform-supporting lever mechanism comprising a main lever, an upper auxiliary lever, a platform supported upon said levers, a lower auxiliary lever, a connection therefrom to the upper auxiliary lever, and a connection from the main lever and one of the auxiliary levers for transmitting the movement of said lever mechanism to the load-offsetting mechanism of the scale.

2. In a weighing scale, platform-supporting lever mechanism comprising a main lever, an upper auxiliary lever, a platform supported upon said levers, a lower auxiliary lever, a connection therefrom to the upper auxiliary lever, and a connection from the main lever and the lower auxiliary lever for transmitting the movement of said lever mechanism to the load-offsetting mechanism of the scale.

3. In a weighing scale, platform-supporting lever mechanism comprising a main lever and upper and lower auxiliary levers, a platform supported upon two of said levers and a connection between the upper and lower auxiliary levers for transmitting the movement of the upper lever to the lower auxiliary lever, and a steelyard rod connected with the main lever and one of the auxiliary levers for actuating the load-offsetting mechanism of the scale upon movement of the lever mechanism.

4. In a weighing scale, platform-supporting lever mechanism comprising a main lever, upper and lower auxiliary levers, connections therebetween for simultaneous movement, a steelyard rod connected with the main lever and one of said auxiliary levers, and a platform supported upon the main lever and the other of said auxiliary levers.

5. In a weighing scale, platform-supporting lever mechanism comprising a main lever of the second order, an upper auxiliary lever of the first order, a platform supported upon said levers, a lower auxiliary lever of the first order, a connection between the upper and lower auxiliary levers, and a steelyard rod connected to the main lever and the lower auxiliary lever.

6. In a weighing scale, platform-supporting lever mechanism comprising a main lever of the second order, an upper auxiliary lever of the first order, a platform supported upon the main lever and one arm of the upper auxiliary lever, a lower auxiliary lever of the first order, a connection between the other arm of the upper auxiliary lever and one arm of the lower auxiliary lever, and a connection from the other arm of the lower auxiliary lever and the main lever for transmitting the movement of said lever mechanism to the load-offsetting mechanism of the scale.

7. In a weighing scale, platform-supporting lever mechanism comprising a main lever, upper and lower auxiliary levers, connections therebetween for simultaneous movement, a steelyard rod connected with the main lever and one of said auxiliary levers, a platform supported upon the main lever and the other of said auxiliary levers, and pivoted links interposed between the platform and its point of engagement with one of said levers.

8. In a weighing scale, platform-supporting lever mechanism comprising a main lever, upper and lower auxiliary levers, connections therebetween for simultaneous movement, a steelyard rod connected with the main lever and one of said auxiliary levers, a platform having legs adapted to be connected with the main lever and the other of said auxiliary levers, and a pair of pivoted links interposed between the legs of the platform and the point of engagement with one of said levers.

9. In a weighing scale, platform-supporting lever mechanism, a platform having a pair of legs rigidly secured thereto and resting upon the lever mechanism, and a pair of legs flexibly connected with the platform and the lever mechanism.

10. In a weighing scale, a platform, platform-supporting lever mechanism, and means for supporting the platform upon said lever mechanism including a pair of rigid legs resting upon the lever mechanism, and a pair of jointed legs intermediate the platform and lever mechanism.

11. In a weighing scale, weighing mechanism, platform-supporting lever mechanism connected therewith, and a platform carried by the lever mechanism and provided with a plurality of legs, some of which rest upon the lever mechanism and the others of which are suspended from the lever mechanism.

12. In a weighing scale, weighing mechanism, platform-supporting mechanism connected therewith, and a platform carried by the lever mechanism having front and rear pairs of legs, one pair being arranged to rest upon the lever mechanism and the other pair being suspended from the lever mechanism.

HALVOR O. HEM.

Witnesses:
 GEORGE R. FRYE,
 C. F. MILLER, Jr.